(12) United States Patent
Kitamura

(10) Patent No.: US 8,223,812 B2
(45) Date of Patent: Jul. 17, 2012

(54) OPTICAL SCANNING APPARATUS

(75) Inventor: Shingo Kitamura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 12/120,192

(22) Filed: May 13, 2008

(65) Prior Publication Data

US 2008/0285605 A1 Nov. 20, 2008

(30) Foreign Application Priority Data

May 15, 2007 (JP) .................................. 2007-129403

(51) Int. Cl.
*H01S 3/13* (2006.01)

(52) U.S. Cl. .................... 372/29.014; 372/38.01; 359/3; 359/204.1; 359/206.1

(58) Field of Classification Search .............. 372/29.014
See application file for complete search history.

(56) References Cited

U.S. PATENT DOCUMENTS

| | | | | |
|---|---|---|---|---|
| 5,883,385 A | * | 3/1999 | Takahashi et al. | 250/235 |
| 6,061,371 A | * | 5/2000 | Uejima et al. | 372/31 |
| 6,469,818 B1 | * | 10/2002 | Kato | 359/204.1 |
| 6,671,299 B2 | * | 12/2003 | Suda | 372/38.01 |
| 2004/0119813 A1 | * | 6/2004 | Bush et al. | 347/259 |

FOREIGN PATENT DOCUMENTS

| | | |
|---|---|---|
| JP | 62-081874 A | 4/1987 |
| JP | 06-031980 A | 2/1994 |
| JP | 6-164070 A | 6/1994 |
| JP | 2002-250885 A | 9/2002 |
| JP | 2002-270941 A | 9/2002 |

* cited by examiner

*Primary Examiner* — Jesscia Stultz
*Assistant Examiner* — Xnning Niu
(74) *Attorney, Agent, or Firm* — Canon USA, Inc., IP Division

(57) ABSTRACT

An optical scanning apparatus includes a light source configured to emit a plurality of laser beams from a plurality of light emitting parts, a beam shaping unit configured to shape the laser beams emitted from the light source, a detection unit provided outside the light source and configured to detect an amount of a laser beam that is not shaped by the beam shaping unit in the laser beams emitted from the light source in an area outside the beam shaping unit, and a light amount control unit configured to control amounts of the laser beams emitted from the light source based on a detection result detected by the detection unit. The detection unit includes a plurality of light-sensitive elements. The light amount control unit controls the light amounts of the laser beams emitted from the light source based on detection results of the light-sensitive elements.

3 Claims, 10 Drawing Sheets

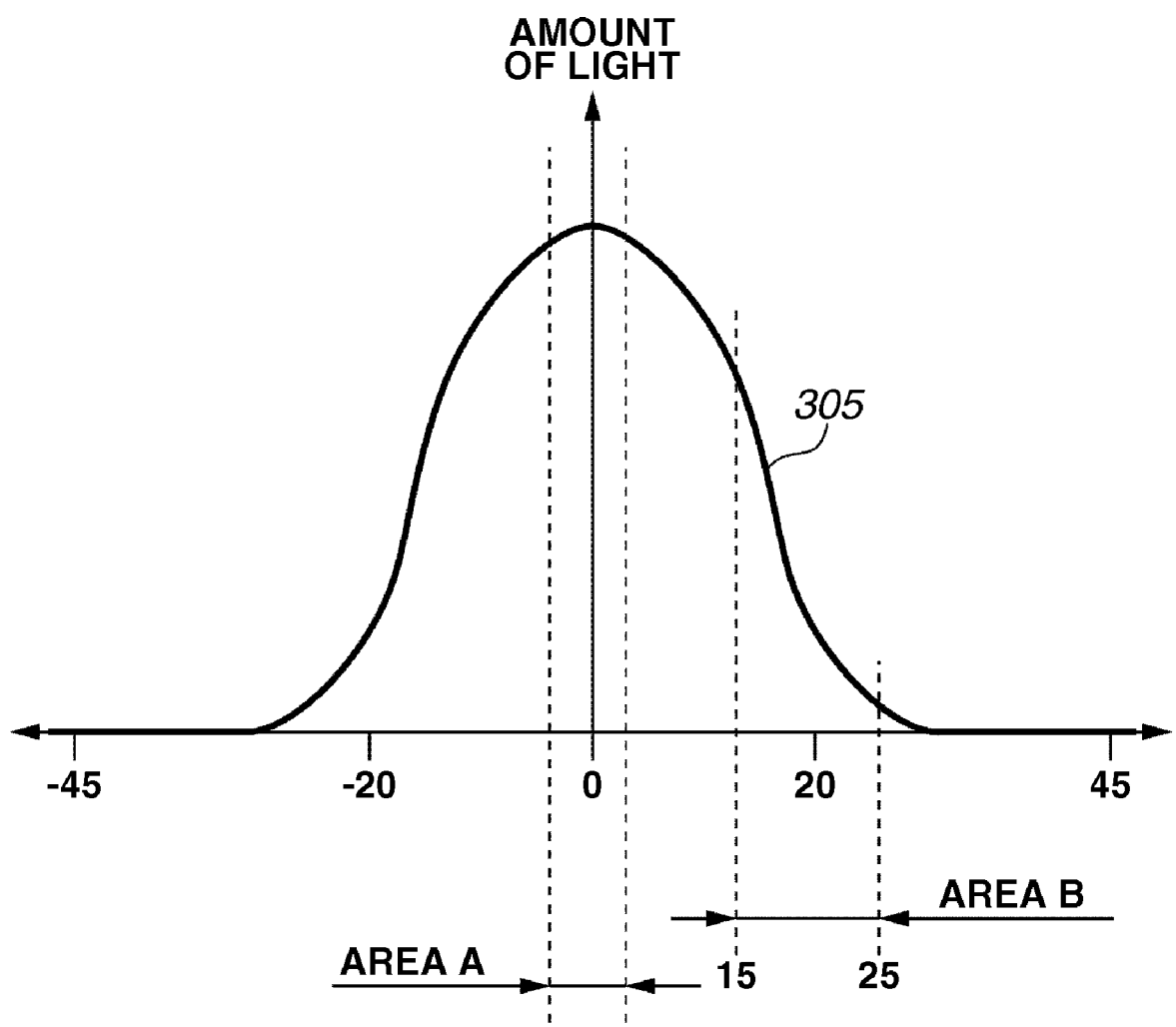

OPTICAL SCANNING APPARATUS

BACKGROUND OF THE INVENTION

1. Field of the Invention

The present invention relates to an optical scanning apparatus that exposes an object to be exposed using light beams.

2. Description of the Related Art

Conventionally, as methods to expose a photosensitive drum in an optical scanning apparatus in an image forming apparatus of an electrophotographic type or the like, laser beams emitted from a semiconductor laser are often used. Most of laser elements of an edge emitting type used in this field are configured to output front light emitted from a front surface of the element and rear light emitted from a rear surface of the element. The rear light is received in a photodetector (PD) that functions as a light-sensitive element, and variation of an amount of the laser beam emitted from the semiconductor laser is monitored. The amount of the laser beam is controlled to be constant by an auto power control (APC) that performs light amount correction. The APC is performed since the laser elements generally have a temperature characteristic that as temperature of the elements increases, the amount of the laser beams to be output decreases.

Meanwhile, in apparatuses such as compact discs (CDs) and digital versatile discs (DVDs), or some printers, emission of rear light from laser elements is eliminated and light of 100% laser amount is emitted from surfaces of the elements as front light. In such printers, a half mirror is disposed between the laser element and an exposure surface of a photosensitive drum, to introduce a part of light to be emitted on the exposure surface to a PD in order to monitor the amount of laser beams.

In order to effectively use the laser beam for image formation, it is necessary to monitor the light amount using a configuration which can minimize a loss on an optical path from the laser element to the exposure surface on the photosensitive drum. However, in the above-described laser emission light amount monitoring methods using the rear light or the half mirror, apart of the amount of the laser beam emitted to the exposure surface is used for monitoring. Accordingly, the amount of the laser beam emitted onto the exposure surface is reduced. Further, in the laser emission light amount monitoring method using the rear light, a correlation between the amount of laser beam emitted onto the exposure surface and the rear light may vary.

Japanese Patent Application Laid-Open No. 6-164070 discusses a use of invalidated vignetted light other than light beams used for exposure as a technique which can perform light amount correction without reducing light use efficiency.

FIGS. 12A and 12B illustrate essential configurations of an optical scanning apparatus applied to conventional image formation discussed in Japanese Patent Application Laid-Open No. 6-164070. FIG. 12A is an overall perspective view of the optical scanning apparatus. FIG. 12B is a cross-sectional view illustrating a characteristic part.

As illustrated in FIG. 12A, a divergent laser beam emitted from a laser element 601 is converted into a parallel light beam by a collimator lens 602. The converted parallel light beam is shaped by passing through an opening of an aperture 603 and enters into a cylinder lens 604. The light beam exited from the cylinder lens 604 arrives on a deflection and reflection plane of a polygonal mirror 605 that is rotationally driven, and is deflected for scanning. The deflected light beams 606 form an image on a photosensitive drum surface via an image forming optical system, and image information is recorded.

As illustrated in FIG. 12B, the aperture 603 is tilted at a 45 degree angle and supported. An incidence plane side is formed as a mirror plane, and configured to be able to reflect a vignetted light 610 that did not pass through the opening in a perpendicular direction as a detection light beam. According to this configuration, the vignetted light 610 is reflected on the mirror plane of the aperture 603 as the detection light beam, condensed by a condenser lens 611, and enters into a PD 612. Then, using a detection output of the PD 612, the above-described APC is performed.

However, the technique discussed in Japanese Patent Application Laid-Open No. 6-164070 involves the following problems.

That is, it is necessary to apply a mirror finish on the surface of the aperture 603. Further, it is necessary to condense the vignetted light 610 reflected on the surface of the aperture 603 using the condenser lens 611 and introduce the condensed light to the PD 612. Accordingly, as compared to conventional apparatuses, necessary parts and the costs will increase. Further, it is necessary to precisely position the PD 612 to introduce the condensed light to the PD 612.

SUMMARY OF THE INVENTION

Embodiments of the present invention are directed to provide an optical scanning apparatus and a light amount control method that can control a light amount correlated with an amount of a laser beam on an exposure plane without reducing the amount of the laser beam on the exposure plane.

According to an aspect of the present invention, an optical scanning apparatus includes a light source configured to emit a plurality of laser beams from a plurality of light emitting parts, a beam shaping unit configured to shape the laser beams emitted from the light source, a detection unit provided outside the light source and configured to detect an amount of a laser beam that is not shaped by the beam shaping unit in the laser beams emitted from the light source in an area outside the beam shaping unit, and a light amount control unit configured to control amounts of the plurality of the laser beams emitted from the light source based on a detection result detected by the detection unit. The detection unit includes a plurality of light-sensitive elements, and the light amount control unit controls the light amounts of the laser beams emitted from the light source based on detection results of the plurality of the light-sensitive elements.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates the FFP in a vertical direction of the edge emitting laser.

DETAILED DESCRIPTION OF THE EXEMPLARY EMBODIMENTS

Various exemplary embodiments, features, and aspects of the invention will be described in detail below with reference to the drawings.

Figure 1:
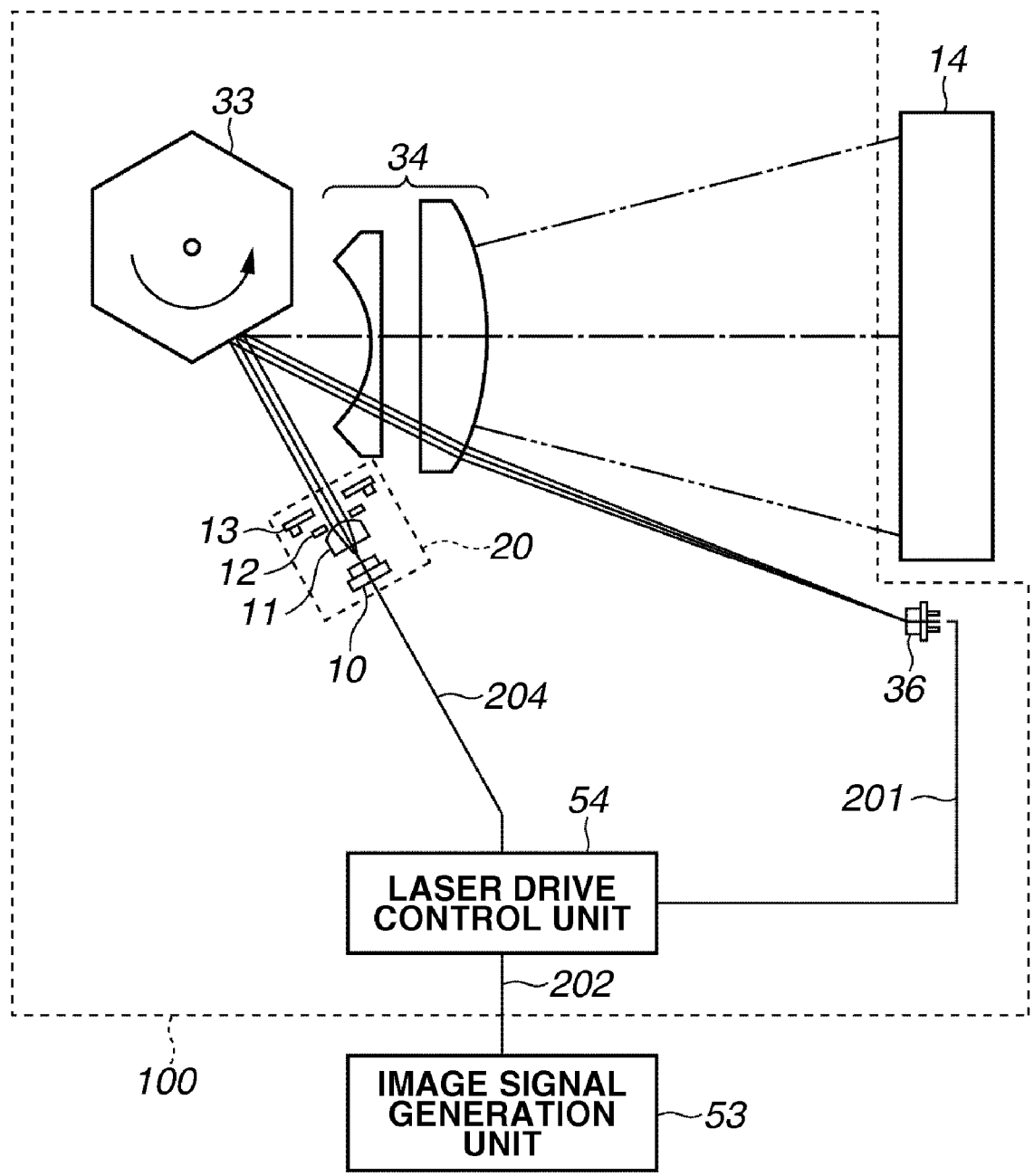
FIG. 1 illustrates a configuration of an optical scanning apparatus according to an exemplary embodiment of the present invention.

FIG. 1 illustrates a configuration of an optical scanning apparatus according to an exemplary embodiment of the present invention. An optical scanning apparatus 100 includes a semiconductor laser 10 that functions as a multi beam laser light source, a collimator lens 11, an optical diaphragm 12, a PD substrate 13 on which PDs 1 to 4 are mounted, a rotating polygonal mirror 33, and f-θ lenses 34 in order. The optical scanning apparatus 100 is configured to scan a photosensitive drum 14 provided in an image forming apparatus. The optical scanning apparatus 100 further includes a beam detection (BD) sensor 36 and a laser drive control unit 54. The laser drive control unit 54 drives and controls the semiconductor laser 10 to emit a laser beam.

Now, a description will be made by following an optical path. A laser beam emitted from the semiconductor laser 10 is converted into substantially parallel beams by the collimator lens 11 and the optical diaphragm 12, and enters the rotating polygonal mirror 33 with a predetermined beam diameter. The rotating polygonal mirror 33 is rotated in a direction indicated by an arrow in FIG. 1 at a constant angular velocity. By the rotation of the rotating polygonal mirror 33, the incident laser beams are converted into deflected beams that continuously change angles and reflected. The deflected beams are condensed by the f-θ lenses 34. At the same time, the f-θ lenses 34 correct distortion of the laser beams so that temporal linearity in scanning is ensured. Thus, the laser beams are combined and the photosensitive drum 14 is scanned with the combined beams at a constant speed.

Further, the optical scanning apparatus 100 includes a BD sensor 36 that detects the laser beams passing through the f-θ lenses 34 from the rotating polygonal mirror 33.

The BD sensor 36 generates a horizontal synchronization signal (BD signal) 201 that is a reference in writing in a main scanning direction, which is a longitudinal direction of the photosensitive drum 14, at a timing the laser beam enters the BD sensor 36. The detection signal 201 is used as the horizontal synchronization signal to synchronize the rotation of the rotating polygonal mirror 33 with writing of data. Based on the horizontal synchronization signal 201, an image signal 202 is output from an image signal generation unit 53 to the laser drive control unit 54.

The laser drive control unit 54 controls a current value and drive time of a drive (light emission) signal 204 of the semiconductor laser 10 based on the image signal 202 that is input from the image signal generation unit 53 in an imaging area for forming a latent image on the photosensitive drum 14. As described above, the laser beam irradiated from the semiconductor laser 10 is converted into a substantially parallel beam by the collimator lens 11 and the optical diaphragm 12, and then, enters the rotating polygonal mirror 33 with a predetermined beam diameter.

The PD substrate 13 is provided at a stage subsequent to the collimator lens 11 and the optical diaphragm 12. On the PD substrate 13, the PDs 1 to 4 are mounted in areas vertically and horizontally outside of outer circumferential ends of the collimator lens 11 and the optical diaphragm 12 and each PD functions as a light-sensitive element. The PD substrate 13 is mounted, for example, on a laser module 20 that is a substrate mounting the semiconductor laser 10. Detection signals from the PDs 1 to 4 are used for light emission amount control of the semiconductor laser 10, that is, for the auto power control (APC).

Figure 2:
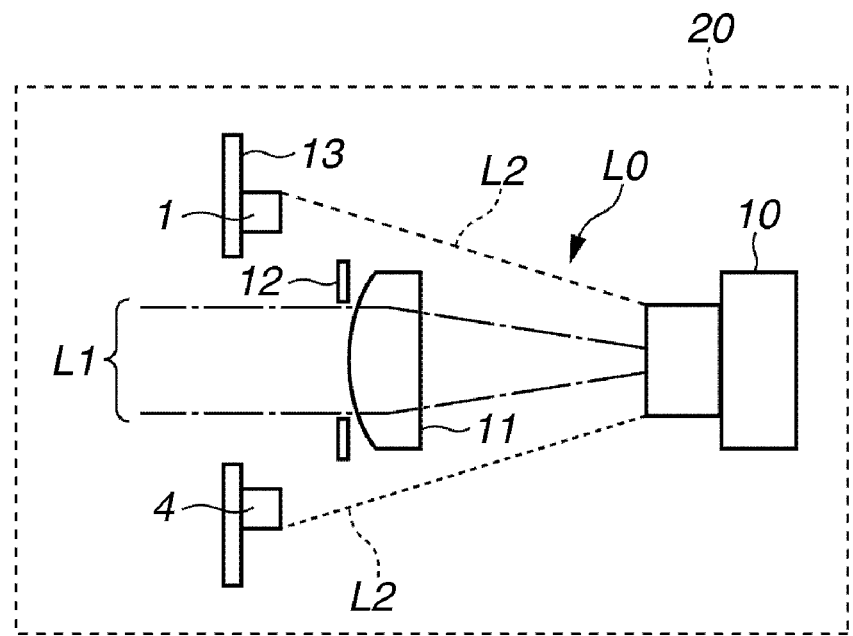
FIG. 2 is an overhead view illustrating a configuration of a laser module according to the exemplary embodiment of the present invention.
Figure 3:
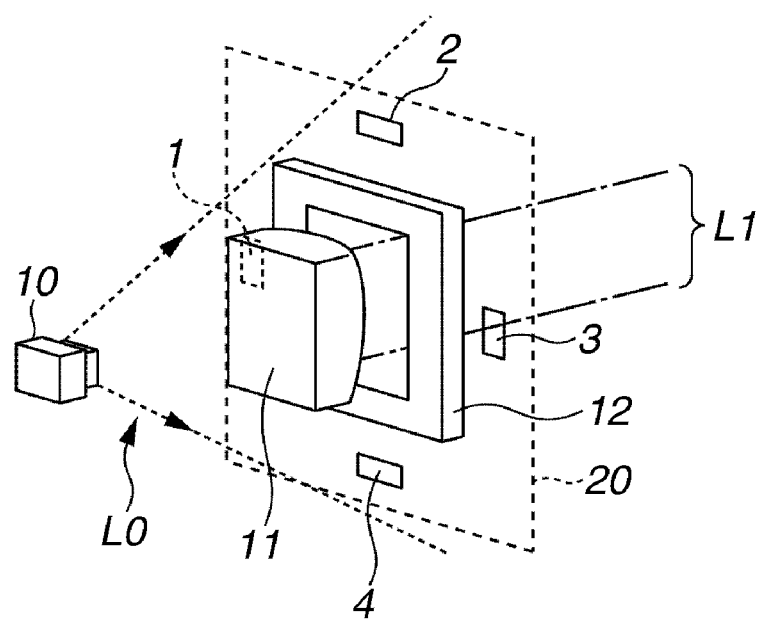
FIG. 3 is a perspective view illustrating a configuration of the laser module according to the exemplary embodiment of the present invention.

FIG. 2 is an overhead view illustrating a configuration of the laser module 20. In FIG. 2, an arrangement relationship of the PD substrate 13 on which the PDs 1 to 4 are mounted and the semiconductor laser 10 is illustrated. FIG. 3 is a perspective view of the laser module 20 to illustrate the arrangement relationship. In FIG. 3, an optical path from the semiconductor laser 10 to the rotating polygonal mirror 33 viewed from an obliquely rear side of the semiconductor laser 10 is schematically illustrated.

The laser module 20 includes the semiconductor laser 10, the collimator lens 11, the optical diaphragm 12, and the PD substrate 13 on which the PDs 1 to 4 are mounted in order.

Now, a description will be made by following the optical path. A part of a divergent laser beam L0 emitted from the semiconductor laser 10 is converted (beam shaped) into substantially parallel light beams L1 by the collimator lens 11 and the optical diaphragm 12, and shaped in a predetermined beam diameter.

Further, the PDs 1 to 4 that function as the light-sensitive element are mounted on the PD substrate 13 at the stage subsequent to the collimator lens 11, in areas vertically and horizontally outside of outer circumferential ends of the collimator lens 11 and the optical diaphragm 12 respectively.

According to the configuration, vignetted light L2 in the divergent laser beam L0 (light beam that is not used to scan the photosensitive drum 14, that is, not beam-shaped light beams) that is an invalid light beam. The invalid light beam does not pass through the collimator lens 11 and the optical diaphragm 12 is detected by the PDs 1 to 4. The detection signals from the PDs 1 to 4 are used for the light emission amount control of the semiconductor laser 10, that is, for the auto power control (APC).

Figure 4:
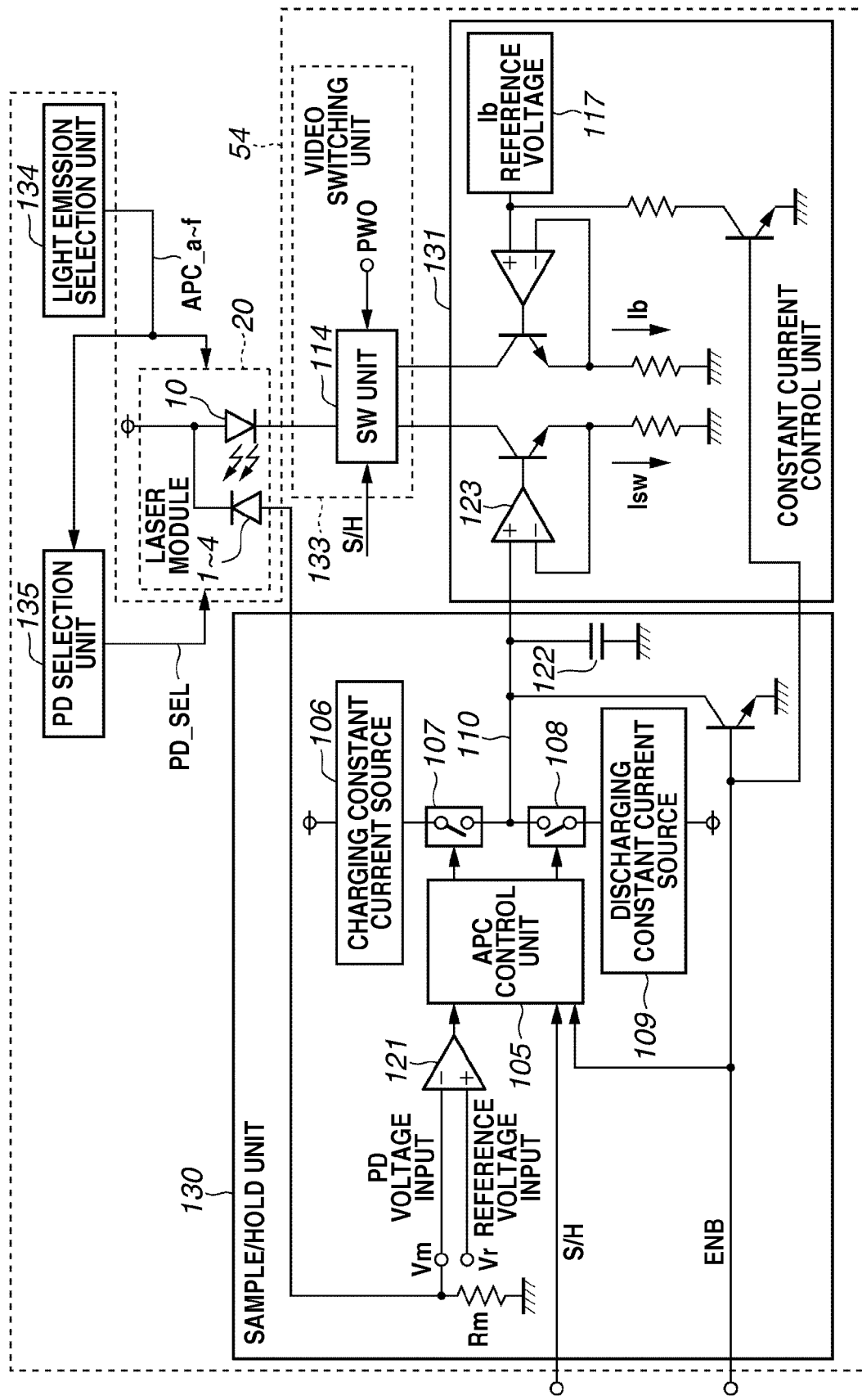
FIG. 4 is a circuit diagram illustrating a configuration of an APC circuit according to the exemplary embodiment of the present invention.

FIG. 4 is a circuit diagram illustrating a configuration of an APC circuit according to the exemplary embodiment of the present invention. The laser drive control unit 54 includes an APC circuit. In order to control an amount of light emission of the laser module 20 provided in the optical scanning apparatus 100, the laser drive control unit 54 includes a sample/hold unit 130, a constant current control unit 131, a video switching unit 133, a light emission selection unit 134, and a PD selection unit 135.

The sample/hold unit 130 compares a PD voltage Vm corresponding to an existing amount of a laser beam (light emission amount) of the semiconductor laser 10 with a reference voltage Vr corresponding to a target light amount of a laser beam, and generates an error signal. The constant current control unit 131 controls a drive current of the semiconductor laser 10 based on the error signal and applies a bias current to the semiconductor laser 10.

The laser module unit 20 includes the semiconductor laser 10 and the PDs 1 to 4. The video switching unit 133 is a block to turn on and off the semiconductor laser 10 based on the image signal (video signal) 202 generated in the image signal generation unit 53.

The light emission selection unit 134 has a function to select a multibeam light emitting element that emits light in the semiconductor laser 10 to adjust an amount of a laser beam of each light emission source in the semiconductor laser 10 to a desired light amount. The PD selection unit 135 that functions as a light-sensitive element selection unit has a function to select a PD to be used from among the PDs 1 to 4 based on the selection result. From the light emission selection unit 134, light emitting part selection signals APC_a to f that indicate a light-emitting element that is to emit light are supplied to the PD selection unit 135 and the laser module 20. From the PD selection unit 135, a PD selection signal PD_SEL (detection result) that indicates a PD to be used is supplied to the laser module 20.

The sample/hold unit 130 operates as follows. The currents in the PDs 1 to 4 generated by the light emission of the semiconductor laser 10 flows into a resistance Rm, and generate a PD voltage Vm. The PD voltage Vm and the reference voltage Vr are compared in a comparator 121. Based on an enable signal ENB from a sequence controller (not shown) and a sample/hold signal S/H, a switch 107 is turned on, and a switch 108 is turned off to perform sampling in a case where Vm<Vr. Then, by using a charging constant current source 106, a capacitor 122 is electrically charged via a node 110.

In a case where Vm>Vr, the switch 107 is turned off, and the switch 108 is turned on and by using a discharging constant current source 108, the capacitor 122 discharges the electric charges via the node 110. The sample/hold unit 130 generates an error voltage between the target laser light amount (laser target light amount) and the laser light amount at the time of sampling (laser sample light amount) detected by the PDs 1 to 4 in the node 110 according to the amount of electric charge in the capacitor 122.

That is, in a case where the laser sample light amount is smaller with respect to the laser target light amount, the capacitor 122 is electrically charged for sampling/holding, and the voltage of the node 110 is raised to increase the current in the constant current control unit 131. On the other hand, in a case where the laser sample light amount is larger with respect to the laser target light amount, the electric charges in the capacitor 122 are discharged, and the voltage of the node 110 is reduced to decrease the current in the constant current control unit 131. As described above, the sample/hold unit 130 generates the error voltage at the time of sampling, and keeps the error voltage at the time of holding.

Next, an operation of the constant current control unit 131 is described. The error voltage generated in the sample/hold unit 130 is input to a comparator 123, and compared with a voltage corresponding to a current Isw flowing in the semiconductor laser 10. By the comparison, the constant current control unit 131 performs a constant current control to apply a constant current corresponding to the held error voltage to the semiconductor laser 10. The constant current control unit 131 also performs a bias current control. That is, the constant current control unit 131 performs the constant current control on a bias current Ib of the semiconductor laser 10 so that a constant current corresponding to a reference voltage 117 that determines the bias current flows. In a case where an ENB signal is an enable signal, a current of Ib+Isw flows in the semiconductor laser 10. In a case where the ENB signal is a disenable signal, the current does not flow in the semiconductor laser 10.

The video switching unit 133 includes a switching (SW) unit 114 to which the image signal 202 and the sample/hold signal S/H are supplied. In a case where the image signal 202 is at an "L" level, the switching unit 114 controls the current of Ib+Isw to flow into the semiconductor laser 10. In a case where the image signal 202 is at an "H" level, the switching unit 114 controls the current of Ib to flow to the semiconductor laser 10. In a case where the S/H signal 202 is at the "L" level that indicates sampling, the switching unit 114 controls the current of Isw+Ib to flow to the semiconductor laser 10 to perform the APC of the laser light amount regardless of the image signal 202.

As described above, by monitoring the light amount of the semiconductor laser 10 and performing the feedback correction on the target light amount, the constant light emission amount can be stably output even if temperatures of the light emitting elements increase or ambient temperatures change.

Now, a far-field pattern (FFP) in a case of using a edge emitting type laser element (edge emitting laser) and a FFP in a case of using a surface emitting type laser element (surface emitting laser) are described.

(I) FFP of an Edge Emitting Laser

Figure 5:
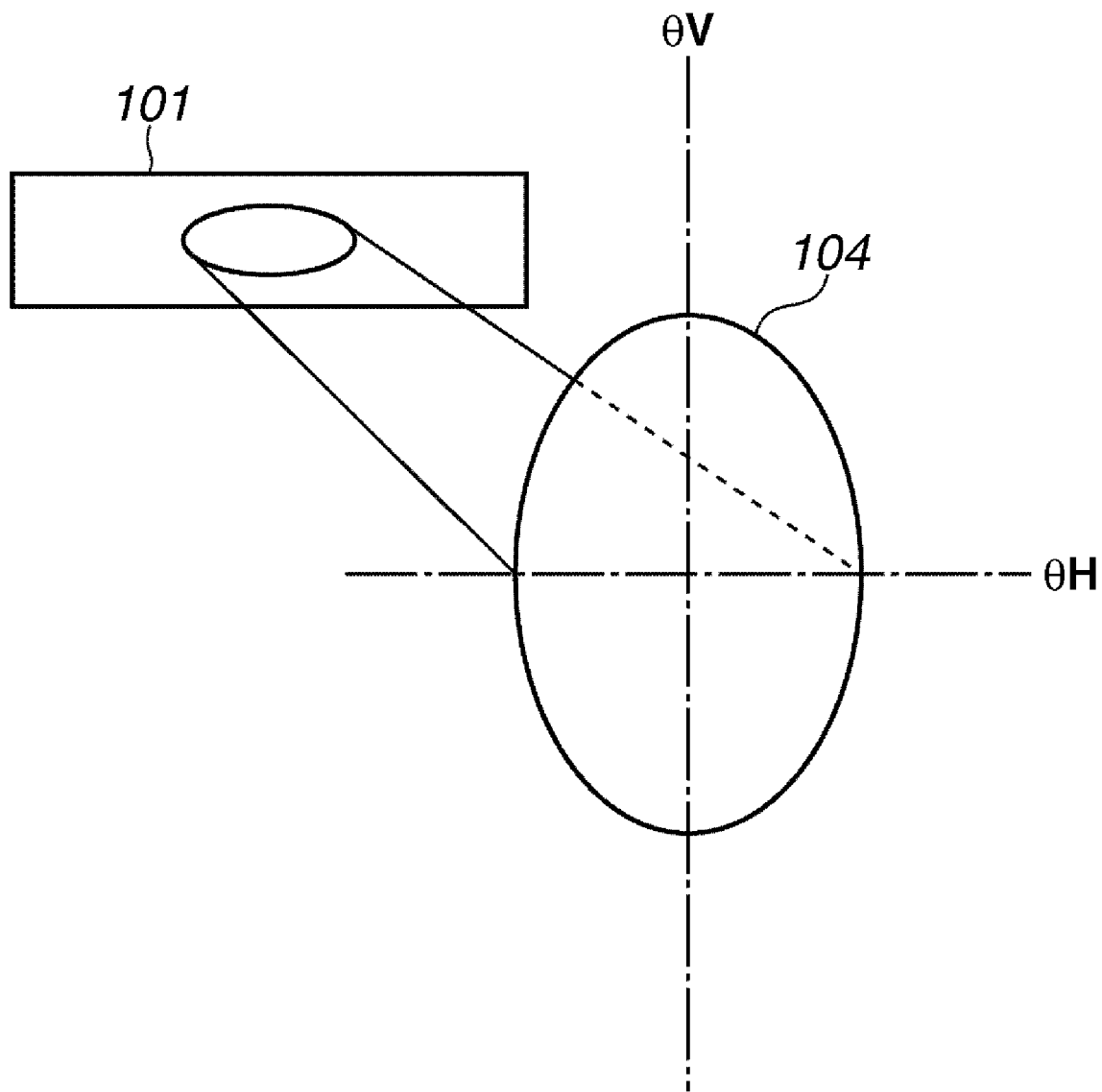
FIG. 5 illustrates a far-field pattern (FFP) of an edge emitting laser.

FIG. 5 illustrates a FFP of an edge emitting laser.

Generally, the edge emitting laser has an elliptical-shaped FFP (optical profile) as illustrated in FIG. 3. In FIG. 5, an edge emitting laser 101 emits a laser beam having an optical profile 104 on a plane that is parallel to and separated from an edge of the laser element by a predetermined distance. In FIG. 5, the FFP in a vertical direction of the optical profile is indicated as θV, and the FFP in a horizontal direction is indicated as θH.

Figure 6A:
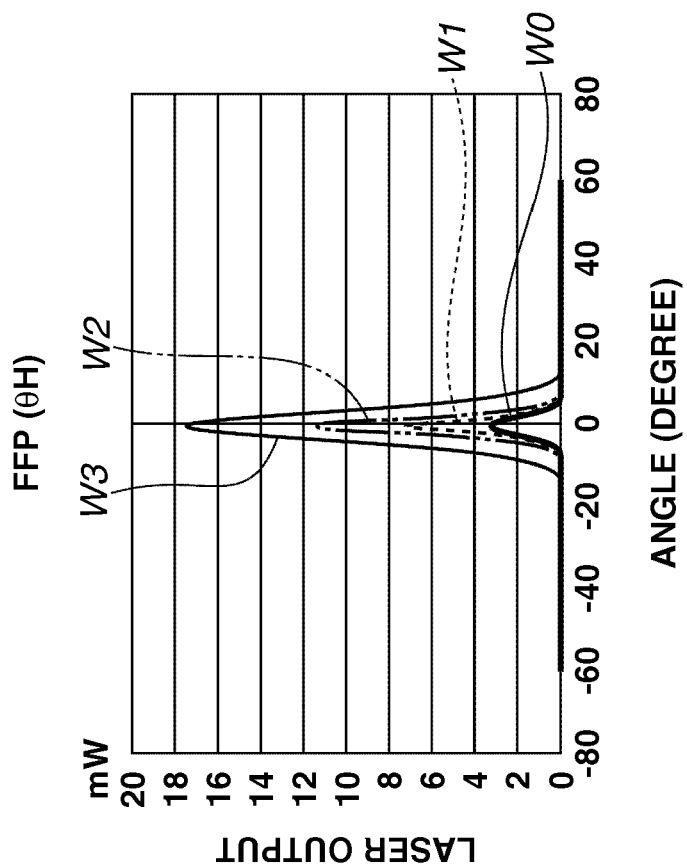
FIGS. 6A and 6B are graphs illustrating relationships between light amounts and the FFPs of the edge emitting laser.
Figure 6B:
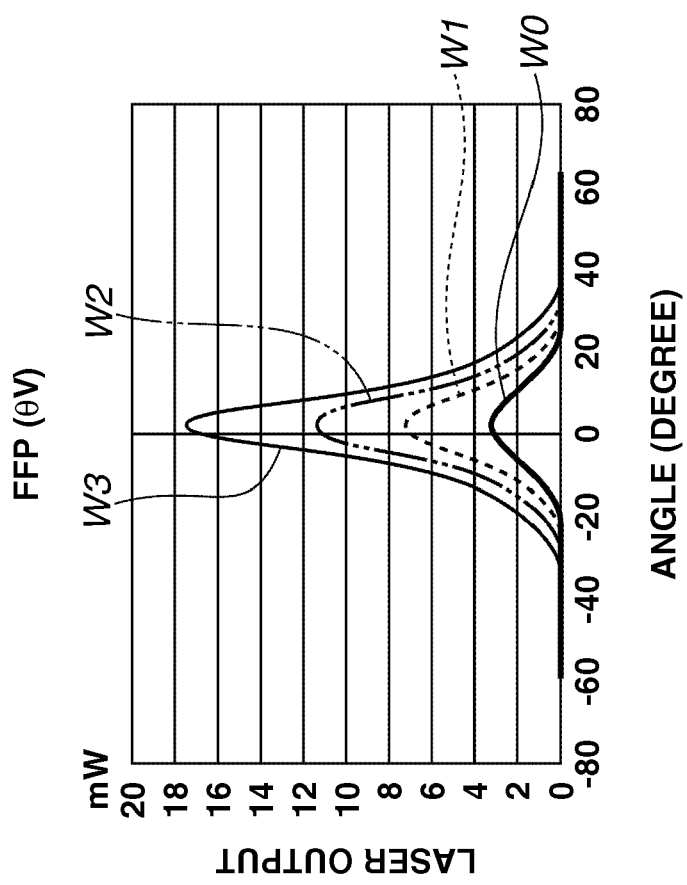

FIGS. 6A and 6B are graphs illustrating relationships between laser outputs (light amount) and the FFPs of the edge emitting laser.

FIG. 6A illustrates profiles of the FFP in the vertical direction θV in laser outputs of 2 mW to 20 mW. FIG. 6B illustrates profiles of the FFP in the horizontal direction θH in laser outputs of 2 mW to 20 mW. In the drawings, W0 denotes a profile in a case where the laser output is 2 mW. W1 denotes a profile in a case where the laser output is 6 mW. W2 denotes a profile in a case where the laser output is 10 mW. W3 denotes a profile in a case where the laser output is 20 mW.

As clearly understood from FIGS. 6A and 6B, the Gaussian-shaped profiles of the FFPs in the vertical direction θV and in the horizontal direction θH relatively vary corresponding to changes in the light amounts (laser outputs).

FIG. 7 illustrates the FFP in a vertical direction of the edge emitting laser. In the drawing, a vertical axis indicates light amounts and a horizontal axis indicates angles.

In FIG. 7, a profile 305 denotes a laser beam profile of the FFP in the vertical direction. In the profile 305, for example, a part actually used to irradiate an electrophotographic photosensitive drum is an area A where the profile is stable. That is, a part corresponding to the area A is converted (beam-shaped) into the substantially parallel light beam L1 by the collimator lens 11 and the optical diaphragm 12 and used as the light beam to form an image on the photosensitive drum 14.

The other parts, namely vignetted light (light beams not beam-shaped) that are invalid light beams which do not pass through the collimator lens 11 and the optical diaphragm 12 are not used as the light beams to form an image on the photosensitive drum 14.

The optical scanning apparatus according to the exemplary embodiment uses the light (vignetted light) other than the light in the area A used for image formation to perform a light amount adjustment (APC) to keep the light amount for the exposure of the photosensitive drum to be constant. Accordingly, the laser beams can be effectively used without losing a light amount for the exposure of the photosensitive drum owing to the light amount adjustment. That is, a light amount in an area B of the FFP in the vertical direction illustrated in FIG. 7 is monitored and based on the change in the light amounts in the part of the area B, the laser emission amounts are corrected.

(II) FFP of a Surface Emitting Laser

Figure 8:
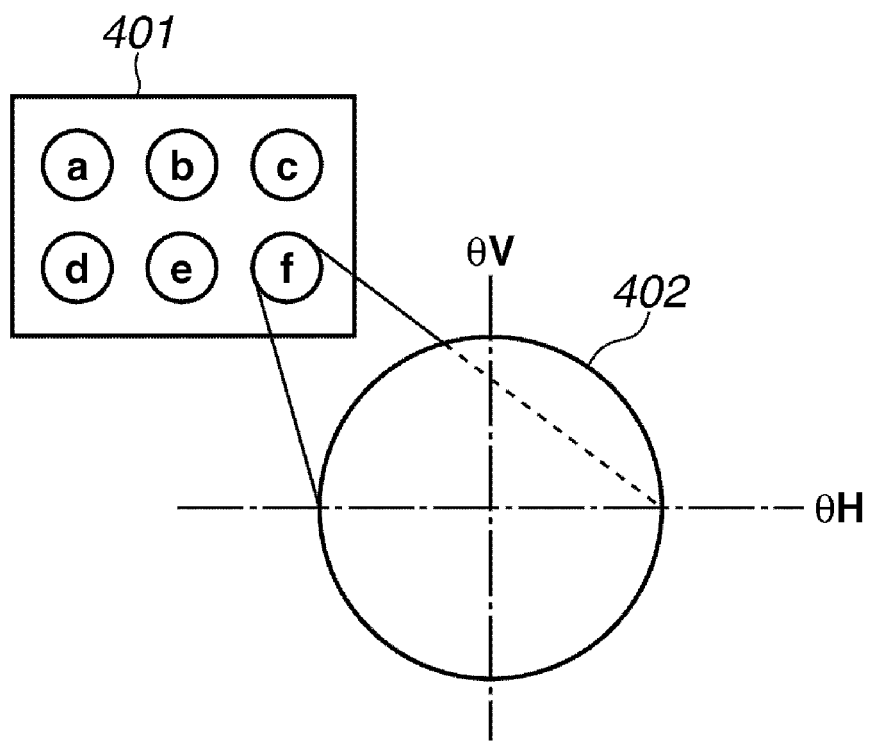
FIG. 8 illustrates a FFP of a surface emitting laser having a plurality of laser emitting parts.

FIG. 8 illustrates a FFP of a surface emitting laser having a plurality of laser emitting parts.

In FIG. 8, a surface emitting laser 401 emits a laser beam having an FFP 402 of the surface emitting laser. In the example, the surface emitting laser element includes the laser emitting units of six laser beams in one element, and an FFP in a case where one of the six beams (a to f) of laser emitting parts is emitted. The shape of the FFP is substantially round. However, in the case where the surface emitting laser is used, for example, an area in the FFP used for exposure of an electrophotographic photosensitive drum is, as described above, a part of the center part of the FFP (corresponds to the area A in FIG. 7).

Figure 9:
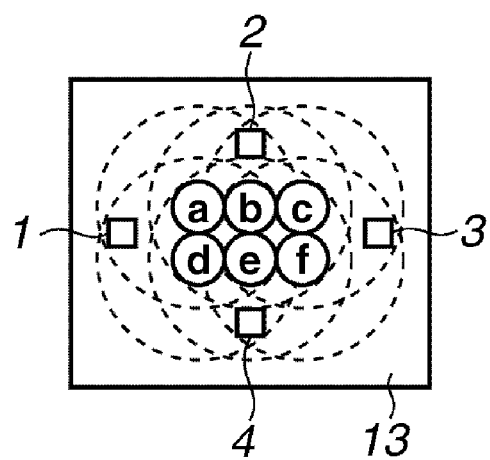
FIG. 9 illustrates laser light amount detection according to the exemplary embodiment of the present invention.

FIG. 9 illustrates laser light amount detection according to the exemplary embodiment of the present invention. In FIG. 9, FFPs on a horizontal plane of the PD substrate 13 that is separated from the surface emitting laser having the six laser emitting parts by a predetermined distance are illustrated.

On the PD substrate 13, four PDs 1 to 4 that are configured to detect laser light amounts are disposed. In FIG. 9, reference numerals a, b, c, d, e, and f denote six light emitting parts, and areas indicated by dotted lines are FFPs on the horizontal plane of the PD substrate 13 corresponding to the six light emitting parts respectively. In areas other than the six areas of the FFPs of a, b, c, d, e, and f used for the exposure of the photosensitive drum, the PDs 1 to 4 respectively detect light amounts of each of the six light emitting parts to correct the light amounts in the six light emitting parts.

Figure 10:
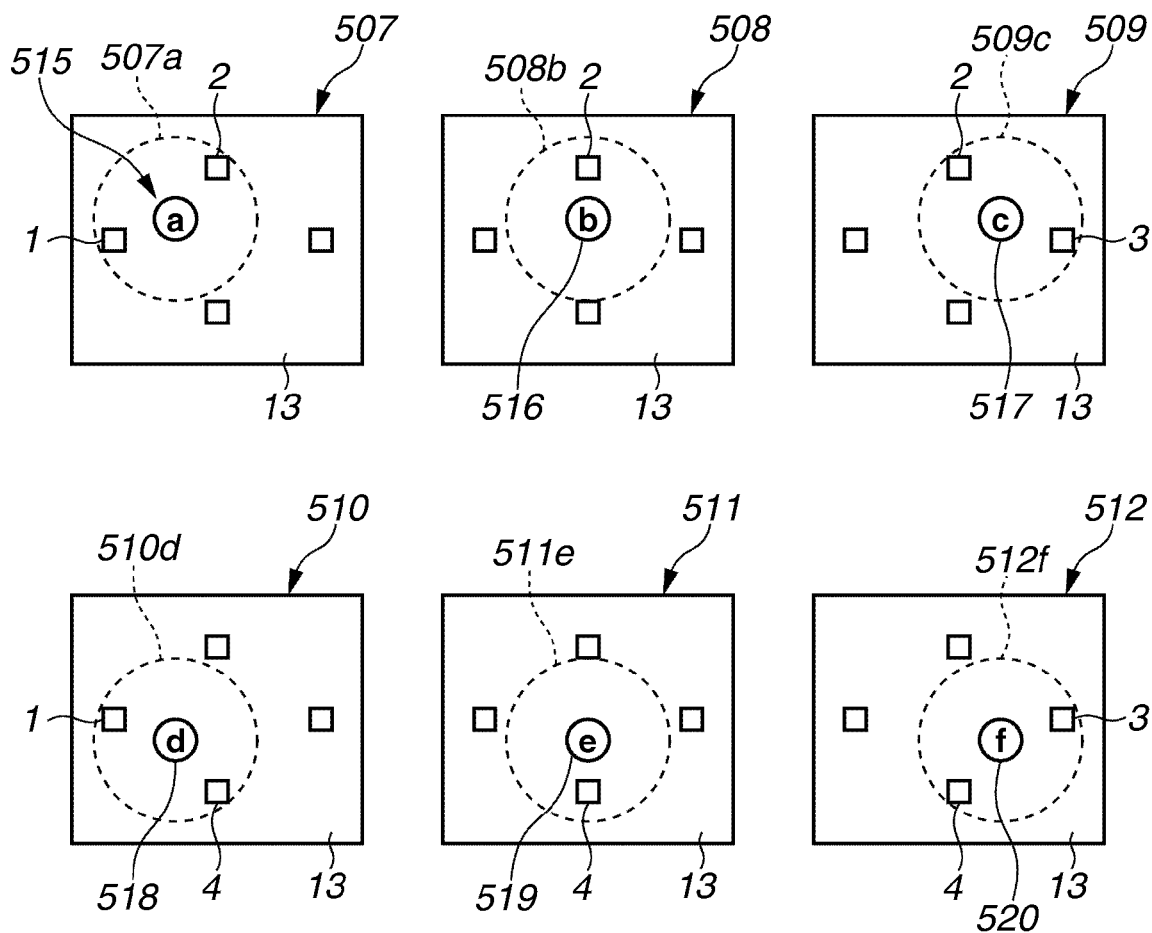
FIG. 10 is a detailed view of FIG. 9.

FIG. 10 is a detailed view of FIG. 9. In FIG. 10, the FFPs corresponding to each of the six light emitting parts are illustrated for each light emitting part.

In FIG. 10, a case 507 illustrates when a laser beam from a light emitting part "a" is detected from six laser beams emitted by the surface emitting laser. A dotted part 507a in the drawing is a light emission area of the laser beam on the horizontal plane of the PD substrate 13 when the light emitting part "a" is lighted. Accordingly, the part actually used to expose the photosensitive drum is a circular part 515 indicated by a solid line. In this case, if the light amount of the laser beam from the light emitting part "a" is detected using the PD1 or the PD2, the light amount used for the exposure is not lost.

Similarly, a case 508 illustrates when a laser beam from a light emitting part "b" is detected from the six laser beams emitted by the surface emitting laser. A dotted part 508b in the drawing is a light emission area of the laser beam on the horizontal plane of the PD substrate 13 when the light emitting part "b" is lighted. Accordingly, the part actually used to expose the photosensitive drum is a circular part 516 indicated by a solid line. In this case, if the light amount of the laser beam from the light emitting part "b" is detected using the PD2, the light amount used for the exposure is not lost.

A case 509 illustrates when a laser beam from a light emitting part "c" is detected from the six laser beams emitted by the surface emitting laser. A dotted part 509c in the drawing is a light emission area of the laser beam on the horizontal plane of the PD substrate 13 when the light emitting part "c" is lighted. Accordingly, the part actually used to expose the photosensitive drum is a circular part 517 indicated by a solid line. In this case, if the light amount of the laser beam from the light emitting part "c" is detected using the PD2 or the PD3, the light amount used for the exposure is not lost.

A case 510 illustrates when a laser beam from a light emitting part "d" is detected. A dotted part 510d in the drawing is a light emission area of the laser beam on the horizontal plane of the PD substrate 13 when the light emitting part "d" is lighted. Accordingly, the part actually used to expose the photosensitive drum is a circular part 518 indicated by a solid line. In this case, if the light amount of the laser beam from the light emitting part "d" is detected using the PD1 or the PD4, the light amount used for the exposure is not lost.

A case 511 illustrates when a laser beam from a light emitting part "e" is detected. A dotted part 51e in the drawing is a light emission area of the laser beam on the horizontal plane of the PD substrate 13 when the light emitting part "e" is lighted. Accordingly, the part actually used to expose the photosensitive drum is a circular part 519 indicated by a solid line. In this case, if the light amount of the laser beam from the light emitting part "e" is detected using the PD4, the light amount used for the exposure is not lost.

A case 512 illustrates when a laser beam from a light emitting part "f" is detected. A dotted part 512f in the drawing is a light emission area of the laser beam on the horizontal plane of the PD substrate 13 when the light emitting part "f" is lighted. Accordingly, the part actually used to expose the photosensitive drum is a circular part 520 indicated by a solid line. In this case, if the light amount of the laser beam from the light emitting part "f" is detected using the PD3 or the PD4, the light amount used for the exposure is not lost.

Further, in the case 507, the light amount of the "a"-laser beam can be detected using both of the PD 1 and the PD2. In such a case, the light amount control can be performed using a value obtained by multiplying the output values of the PD1 and PD2. Similarly, in cases 509, 510, and 512, the light amount control can be performed using the output values of the above-described two PDs respectively.

As described above, in the surface emitting laser that emits a plurality of laser beams and the edge emitting laser that emits a plurality of beams, the vignetted light of each beam can be detected by disposing the plurality of PDs.

Figure 11:
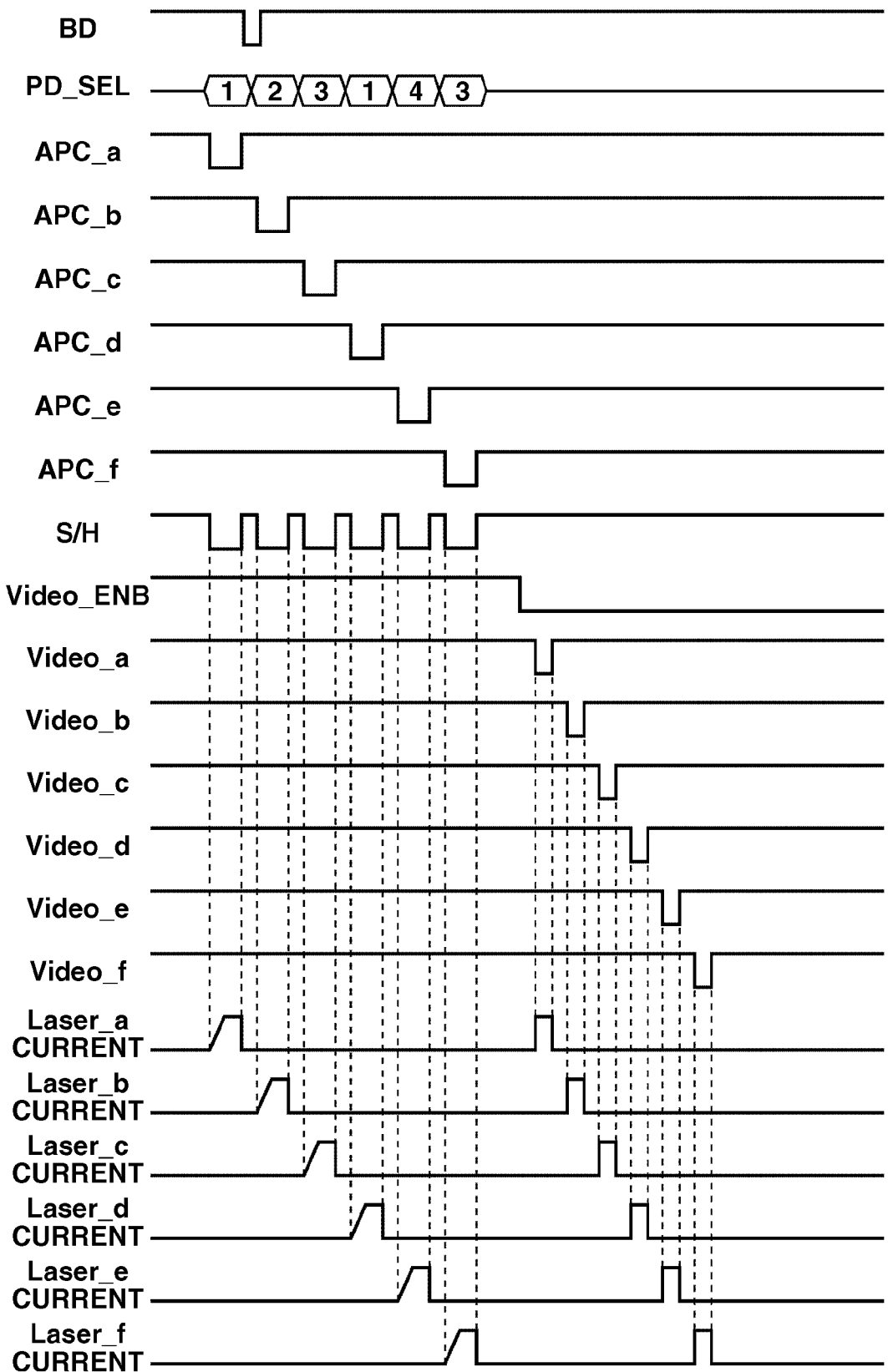
FIG. 11 is a timing chart illustrating an APC according to the exemplary embodiment of the present invention.
Figure 12A:
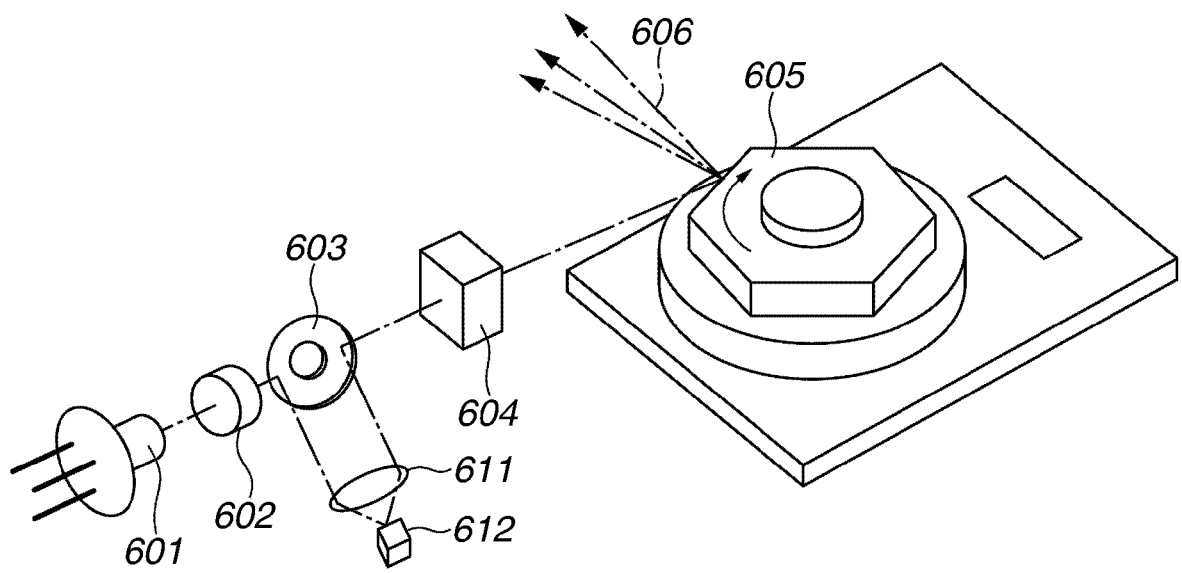
FIGS. 12A and 12B illustrates essential configurations of a conventional optical scanning apparatus.
Figure 12B:
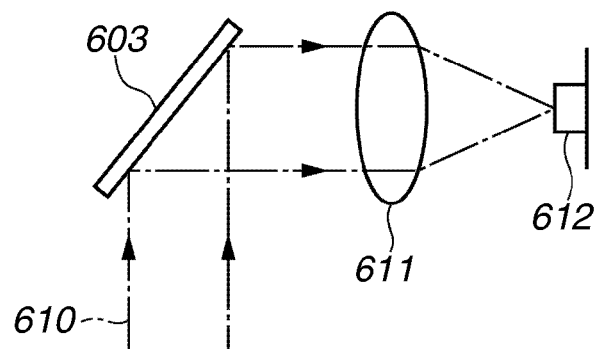

FIG. 11 is a timing chart illustrating an APC according to the exemplary embodiment of the present invention.

The BD sensor 36 generates the horizontal synchronization signal (BD signal) 201 that is a reference in writing in a main scanning direction, which is a longitudinal direction of the photosensitive drum 14, at a timing the laser beam enters the BD sensor 36. The detection signal 201 is used as the horizontal synchronization signal to synchronize the rotation of the rotating polygonal mirror 33 with writing of data. Based on the horizontal synchronization signal 201, the image signal 202 is output from the image signal generation unit 53 to the laser drive control unit 54.

A BD signal in FIG. 11 is the horizontal synchronization signal (BD signal) 201 that is the reference in writing in the main scanning direction that is the longitudinal direction of the photosensitive drum 14 output by the BD sensor 36 at the timing the laser beam enter the BD sensor 36. A PD_SEL signal is the above-described PD selection signal. As illustrated in FIG. 10, the PD_SEL signal includes an address to select one of the four PDs PD1 to PD4.

The APC_a to f signals are light emitting part selection signals to select a target light emitting part to adjust an amount of a laser beam of the selected part in the six light emitting parts respectively. For example, if an amount of a laser beam emitted by the light emitting part "a" is corrected among the six laser beams, the APC_a signal is set at the "L" level, and only the light emitting part "a" is lighted. The S/H signal is the sample/hold signal to sample an amount of a laser beam. If the S/H signal is at the "L" level, the PD selected by the PD selection signal PD_SEL samples a light amount of the laser beam emitted by the light emitting part selected by one of the APC_a to f signals (see FIG. 4).

For the light amount of each laser beam output from the six light emitting parts "a" to "f", a PD output value corresponding to a target light amount is set in advance. Currents are controlled so that light amounts of sampled PDs become the target values. Laser_a to f currents indicate currents to be applied to the six light emitting parts of the surface emitting laser. For example, if the APC_a signal is at the "L" level and the light emission part "a" is selected, the PD1 is selected by the PD_SEL signal, and the S/H signal is at the "L" level, the following steps are executed. That is, the Laser_a current is increased until the output of the PD1 becomes the predetermined value. Similarly, the laser beams emitted from the light emission parts "b" to "f" are controlled so that the light amounts become the predetermined values. Further, based on the Laser_a to f current values that are determined according to the timing in the APC, each light emission source of the light emitting parts "a" to "f" outputs Video_a to f corresponding to the image signal 202 for performing image formation at timing of a Video_ENB.

If the PDs 1 to 4 are provided on an outer circumference of the optical diaphragm 12, the PD substrate 13 is not necessary and the costs can be reduced. Further, the above-described effects can be similarly realized.

According to the present exemplary embodiment, the APC can be performed using not rear light but vignetted light in front light that is not used for an actual exposure. Accordingly, the light amount control correlated with the laser light amount on the exposure surface (on the photosensitive drum) can be performed without reducing the laser light amount on the exposure surface. Further, the vignetted light is directly received by the PDs 1 to 4, so that components for condensing the vignetted light such as a lens are not necessary. Further, it is not necessary to precisely position the PDs to introduce the condensed light to the PDs disposed at positions where the light cannot be directly received. Accordingly, the optical scanning apparatus can be realized at a low cost.

Further, the use of vignetted light eliminates the need for rear light. Accordingly, all laser beams can be used as the front light. Thus, for example, in an electrophotographic printer, the light amount used for the exposure of the photosensitive drum can be readily increased. Accordingly, a high-speed and low-cost printer can be achieved.

According to the above-described exemplary embodiment, the PDs 1 to 4 are disposed at the stage subsequent to the collimator lens 11 in order to directly receive the vignetted light using the PDs 1 to 4. However, a reflection mirror or an optical fiber can be provided at a stage preceding the collimator lens 11 to introduce vignetted light before being collimated by the collimator lens 11 to the PDs via the reflection mirrors or the optical fiber. Further, the reflection mirror or the optical fiber can be provided at the stage subsequent to the collimator lens 11. In this case, a plurality of parts of the vignetted light can be introduced to one of the PDs via the reflection mirror or the optical fiber, and the APC can be performed based on the value of the PD.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-129403 filed in May 15, 2007 which is hereby incorporated by reference herein in its entirety.

What is claimed is:

1. An exposure apparatus comprising:
 a light source including a first emitting portion for emitting a first laser beam and a second emitting portion for emitting a second laser beam to expose a photosensitive member;
 a beam shaping unit disposed on optical paths of the first and second laser beams and configured to shape the first and second laser beams;
 a first light receiving element configured to receive a light beam of the first laser beam in an area where a light beam does not pass through the beam shaping unit;
 a second light receiving element configured to receive a light beam of the second laser beam in an area where a light beam does not pass through the beam shaping unit; and
 a light amount control unit configured to control a light amount of the first laser beam based on a light reception result of the first light receiving element and to control a light amount of the second laser beam based on a light reception result of the second light receiving element;
 wherein the first light receiving element and the second light receiving element are disposed at a stage subsequent to the beam shaping unit, and receive light beams of the first and second laser beams in an area where a light beam does not pass through the beam shaping unit.

2. An exposure apparatus comprising:
 a light source including a first emitting portion for emitting a first laser beam and a second emitting portion for emitting a second laser beam to expose a photosensitive member;
 a beam shaping unit disposed on optical paths of the first and second laser beams and configured to shape the first and second laser beams;
 a first light receiving element configured to receive a light beam of the first laser beam in an area where a light beam does not pass through the beam shaping unit;
 a second light receiving element configured to receive a light beam of the second laser beam in an area where a light beam does not pass through the beam shaping unit; and
 a light amount control unit configured to control a light amount of the first laser beam based on a light reception result of the first light receiving element and to control a light amount of the second laser beam based on a light reception result of the second light receiving element;
 wherein the beam shaping unit includes a collimator lens configured to convert the laser beams emitted from the first emitting portion and the second emitting portion into laser beams parallel to a traveling direction of the laser beams.

3. An exposure apparatus comprising:
a light source including a first emitting portion for emitting a first laser beam and a second emitting portion for emitting a second laser beam to expose a photosensitive member;
a beam shaping unit disposed on optical paths of the first and second laser beams and configured to shape the first and second laser beams;
a first light receiving element configured to receive a light beam of the first laser beam in an area where a light beam does not pass through the beam shaping unit;
a second light receiving element configured to receive a light beam of the second laser beam in an area where a light beam does not pass through the beam shaping unit; and
a light amount control unit configured to control a light amount of the first laser beam based on a light reception result of the first light receiving element and to control a light amount of the second laser beam based on a light reception result of the second light receiving element;
wherein the beam shaping unit includes an aperture for restricting passage of the laser beams emitted from the first emitting portion and second the emitting portion.

* * * * *